United States Patent
Lasley et al.

(10) Patent No.: US 7,232,522 B1
(45) Date of Patent: Jun. 19, 2007

(54) SELF LOCKING BOWL RETAINER FOR A FILTER CAN

(75) Inventors: Michael Edward Lasley, Mount Holly, NC (US); Peter Charles Campbell, Gastonia, NC (US)

(73) Assignee: Wix Filtration Corp., Gastonia, NC (US)

( * ) Notice: Subject to any disclaimer, the term of this patent is extended or adjusted under 35 U.S.C. 154(b) by 918 days.

(21) Appl. No.: 10/265,904

(22) Filed: Oct. 8, 2002

(51) Int. Cl.
B01D 27/08 (2006.01)

(52) U.S. Cl. ............... 210/232; 210/308; 210/444; 210/451

(58) Field of Classification Search ......... 210/303, 210/312, 313, 443, 444, 450, 295, 307, 308, 210/232, 309, 451; 220/602, 613; 285/203, 285/204, 206
See application file for complete search history.

(56) References Cited

U.S. PATENT DOCUMENTS

| | | | |
|---|---|---|---|
| 607,316 A | * 7/1898 | Winters | .................. 285/206 |
| 2,553,342 A | * 5/1951 | Trageser | .................. 285/206 |
| 4,692,245 A | * 9/1987 | Church et al. | ............. 210/232 |
| 4,764,275 A | 8/1988 | Robichaud | |
| 5,035,797 A | 7/1991 | Janik | |
| 5,154,823 A | 10/1992 | Ma et al. | |
| 5,186,829 A | 2/1993 | Janik | |
| 5,593,577 A | 1/1997 | Imai et al. | |
| 5,622,623 A | * 4/1997 | Stone | ....................... 210/232 |
| 6,139,738 A | 10/2000 | Maxwell | |

* cited by examiner

Primary Examiner—Matthew O. Savage
(74) Attorney, Agent, or Firm—Honigman Miller Schwartz & Cohn LLP

(57) ABSTRACT

In a Racor filter, an adaptor is provided to threadably mount a water collecting bowl to a can containing a filter element. In order to prevent the adaptor from rotating with respect to the can, the adaptor has an axially extending rim with a non-circular cross section that complements a non-circular opening through the bottom of the can. In a preferred embodiment, the non-circular opening has two chord segments disposed opposite from one another which engaged two chord segment flats on the threaded rim.

17 Claims, 4 Drawing Sheets

SELF LOCKING BOWL RETAINER FOR A FILTER CAN

FIELD OF THE INVENTION

The present invention is directed to a self-locking bowl retainer for a filter can. More particularly, the present invention is directed to a self-locking bowl retainer for a filter can wherein the bowl retainer does not rotate with respect to the can when the bowl is mounted thereon.

BACKGROUND OF THE INVENTION

Racor filters are used to filter fuel, especially diesel fuel, prior to combustion of the fuel, and remove water as well as particulates from the fuel. With Racor filters, a bowl is placed beneath the filter element to collect water which has been separated from the fuel by the filtering process. Periodically, the water is removed from the bowl by opening a normally closed valve in the bottom of the bowl and bleeding water off. The bowl is preferably made of transparent plastic so that water collected therein is visible.

The current practice is to utilize a threaded bowl retainer which has a radially projecting annular shoulder that extends outwardly from the axis of the annular retainer and an axially extending rim which is externally threaded. The shoulder of the adaptor engages an inwardly projecting annular land on the can, which annular land defines a circular opening through which the externally threaded, axially projecting rim extends. In order to keep the rim from rotating with respect to the can, a layer of adhesive is disposed between the annular shoulder of the adaptor and the annular land of the can to lock the adaptor to the can so that when the bowl is screwed onto the externally threaded rim, the adaptor does not rotate.

Utilizing adhesive is a relatively expensive undertaking which can be troublesome and unreliable because of material problems with the epoxy used for the adhesive. Such problems include mixture ratio concerns, problems in dispensing the epoxy, mechanical problems with the dispensing machine and difficulties in curing the epoxy after assembly. Since the only purpose of epoxy is to prevent rotation of the adaptor with respect to the can, it is unnecessary to bond the adaptor to the can for any other purpose. Generally, the elimination of one component, i.e. epoxy improves reliability because it reduces the potential for failure of that component, and thus reduces the chance of failure of the entire assembly. Moreover, there is an advantage in the elimination of both a troublesome process and an expensive sub assembly operation. An additional economic advantage to eliminating epoxy adhesive is the reduction of inventory. Inventory is reduced because the sub assemblies of adaptors and cans no longer must be stored since the components can be delivered directly to the assembly line for final filter assembly.

SUMMARY OF THE INVENTION

With the aforementioned considerations in mind, the present invention is directed to a can for containing a filter element wherein the can has a water and debris collecting container attached thereto. The can comprises an annular housing containing a filter element and annular adaptor for threadably attaching the water collecting container thereto. The annular housing has a first end and a second end, wherein the first end is defined by an inwardly projecting land having an opening therethrough defined by a non-circular edge. The annular adaptor has a shoulder for positioning inside the can at the annular land. The annular adaptor further has an externally threaded annular rim disposed about an axis for threadably attaching the container thereto, the annular rim being non-circular and complementing the non-circular edge of the annular land to prevent rotation of the adaptor with respect to the can.

In a further aspect of the invention, the non-circular edge of the annular land comprising at least one non-circular portion facing inwardly toward the axis of the rim, the non-circular portion being spaced from the axis by a distance which is less than that of other portions of the edge defining opening. In a further aspect of the invention, the non-circular edge is a chord of a circle otherwise defining the opening, and in a still further aspect of the invention, the non-circular opening defined by the edge includes two chords of a circle otherwise defining the opening.

In another embodiment of the invention, non-circular edge of the land comprises at least one tab projecting inwardly from the perimeter of the opening, the annular rim having a slot therein for receiving the tab to prevent rotation of the annular adaptor with respect to the can.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
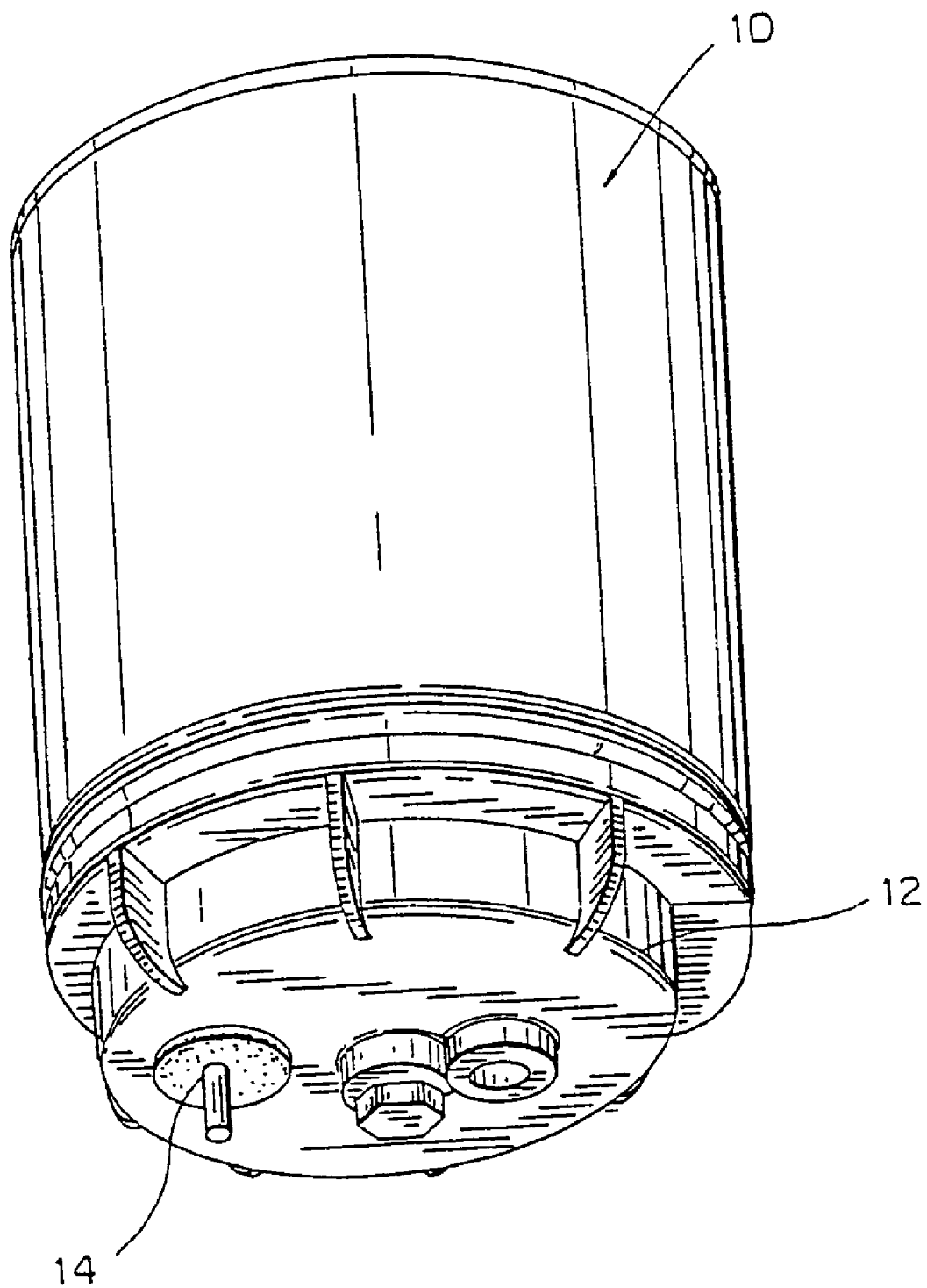
FIG. 1 is a perspective view of a can for containing a filter element and a bowl attached thereto in accordance with the principles of the present invention.

Referring now to FIG. 1 there is shown a can 10 which contains a filter element and which includes a transparent bowl 12 that is detachable attached thereto. The can 10 and bowl 12 are part of an assembly for a Racor fuel filter which separates water from fuel, such as diesel fuel. Water accumulates in the bowl 12 and since the bowl is transparent, the water is readily visible. In order to remove water which has settled in the bowl, a valve 14 is opened against the bias of a spring so that the water may be drained out of the bowl.

Figure 2:
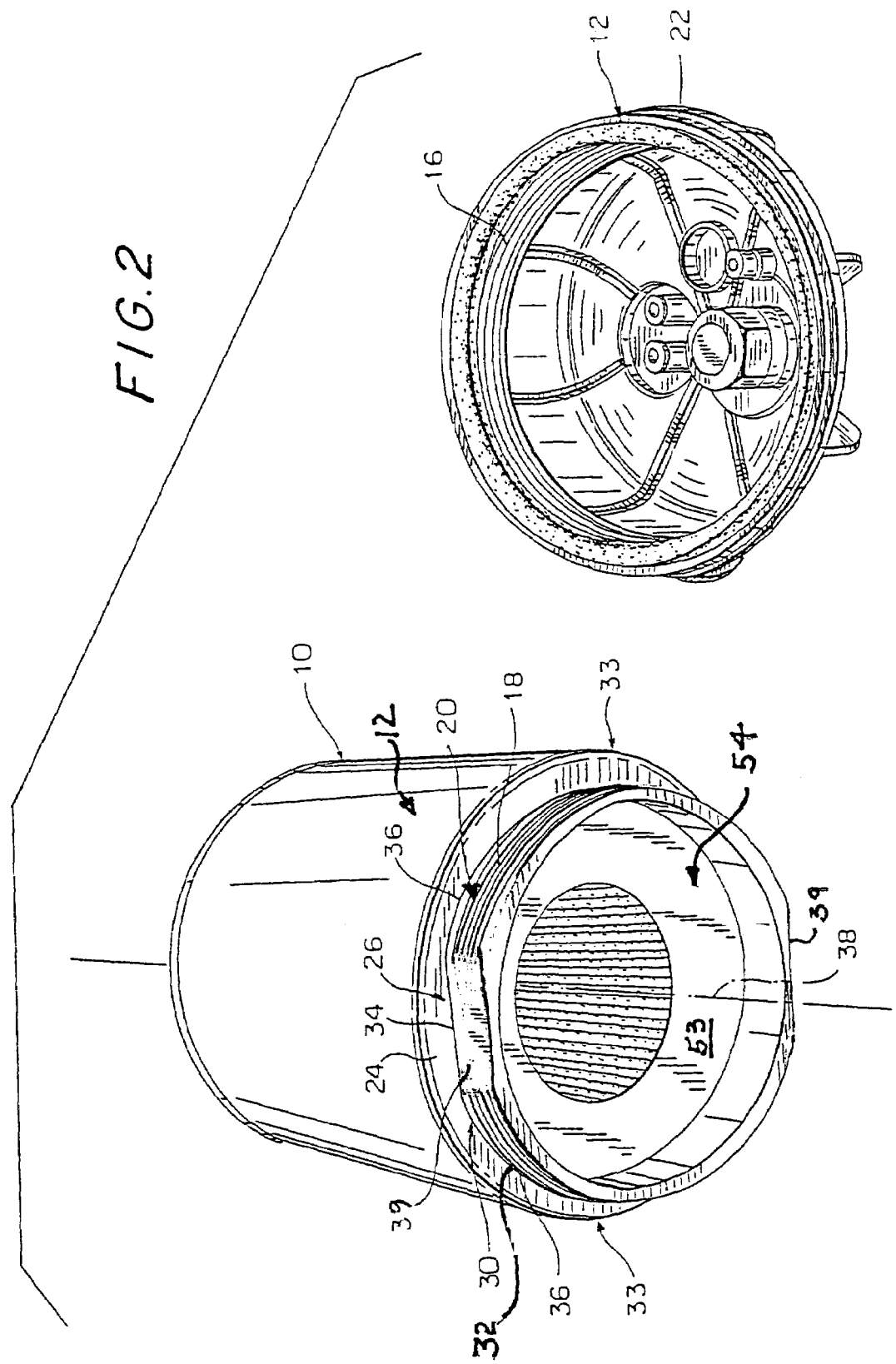
FIG. 2 is a perspective view showing the can with the bowl detached therefrom exposing a filter element within the can.

As is seen in FIG. 2, the bowl 12 is readily detachable from the can 10 for cleaning. In order to facilitate detaching the bowl 12 from the can 10, the bowl 12 has an internal thread 16 which mates with an external threaded rim 18 on the can. As will be further explained hereinafter, the threaded rim 18 is unitary with an adaptor 20 that is seated within the can 12. The adaptor 20 is made of a hard plastic, such as NYLON® (polyamide) or polypropylene, while the can is made of metal such as steel or aluminum. In order to seal the bowl 12 with the can, the bowl has a gasket 22 which engages the top surface 24 of a land 26. The land 26 is unitary with the can 10 and defines a non-circular opening 30 through which the non-circular threaded rim 18 of adaptor 20 projects.

In accordance with the principles of the present invention, the opening 30 in the land 26 is defined by an edge 32 which is not circular because it includes at least one non-circular segment 34. The non-circular segment 34 in FIG. 2 is a straight segment forming a chord of a circle, the circle being defined by arcuate portions 36 of the edge 32 which are further from the axis 38 than the chord 34. By having at least one non-circular portion complementing the non-circular opening 30 through the land 26, the threaded rim 18 cannot rotate with respect to the can 10 when seated in the non-circular opening 30.

The non-circular portion of the threaded rim 18 is formed by at least one flat 39 occurring at a chord of a circle, which otherwise defines the threaded rim. In the preferred embodiment, there are two opposites facing flats 39 on the threaded rim 18 which compliment the two opposed straight segments 34 defining the non-circular opening 30 of the land 26.

Figure 3:
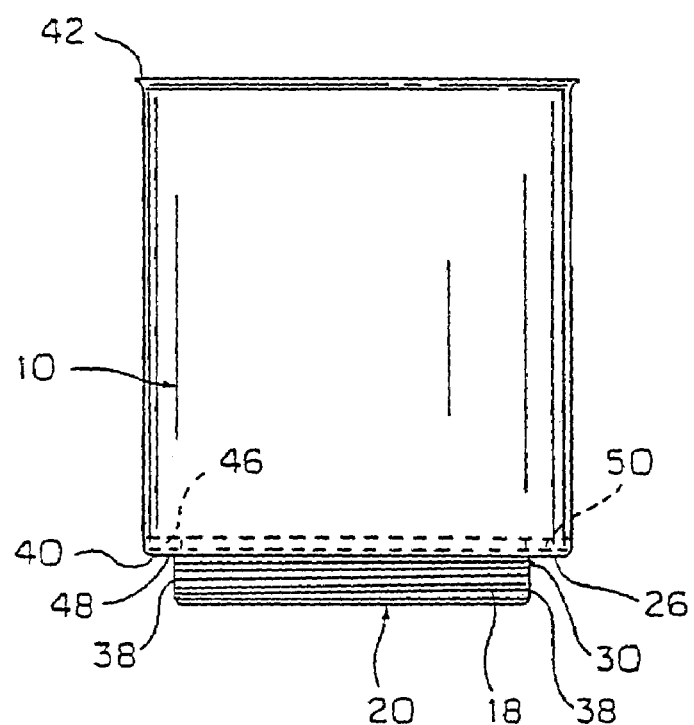
FIG. 3 is a side view of the can and adaptor shown in FIGS. 1 and 2.
Figure 4:
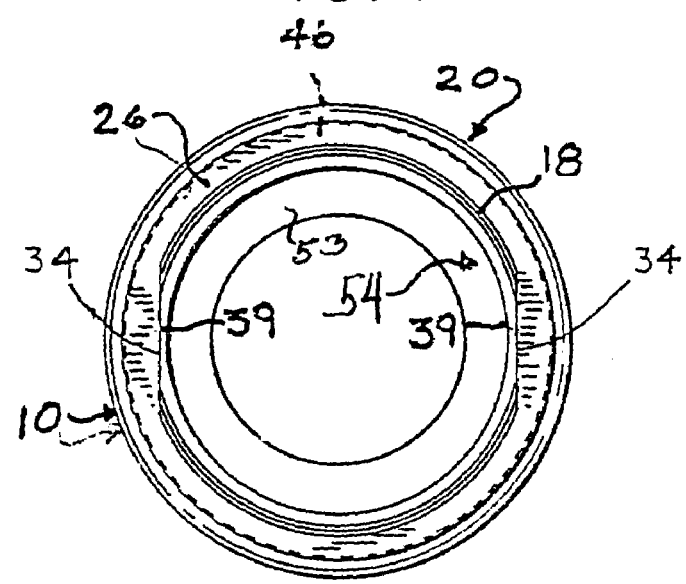
FIG. 4 is a bottom view of the can of FIG. 3.
Figure 5:
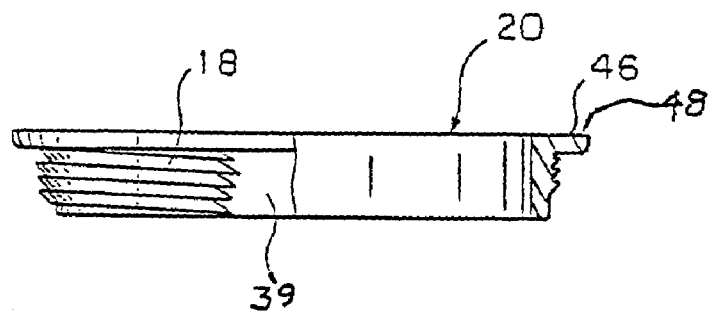
FIG. 5 is a side view, partially in elevation, showing an adaptor configured in accordance with the principles of the present invention.

Referring now to FIGS. 3-5 it is seen that the can 10 has first and second ends 40 and 42, respectively, with the first end 40 defining the non-circular opening through which the non-circular rim 18 of the adaptor 20 passes. The non-circular rim 18 is unitary with an annular flange 46 which provides a shoulder 48 that abuts the inner surface 50 of the land 26 in order to hold the adaptor 20 within the housing 10.

When the adaptor 20 is slid into position in the can 10, the rim 18 is prevented from rotation by opposed the non-circular chord segments 34 which engage the flats 39 on the rim 18 until the shoulder 48 seats against internal surface 50 of the land 26. The end cap 53 of a filter element 54 (see FIG. 2) within the can 10 bears against the flange 46 and holds the adaptor axially in position.

Figure 6:
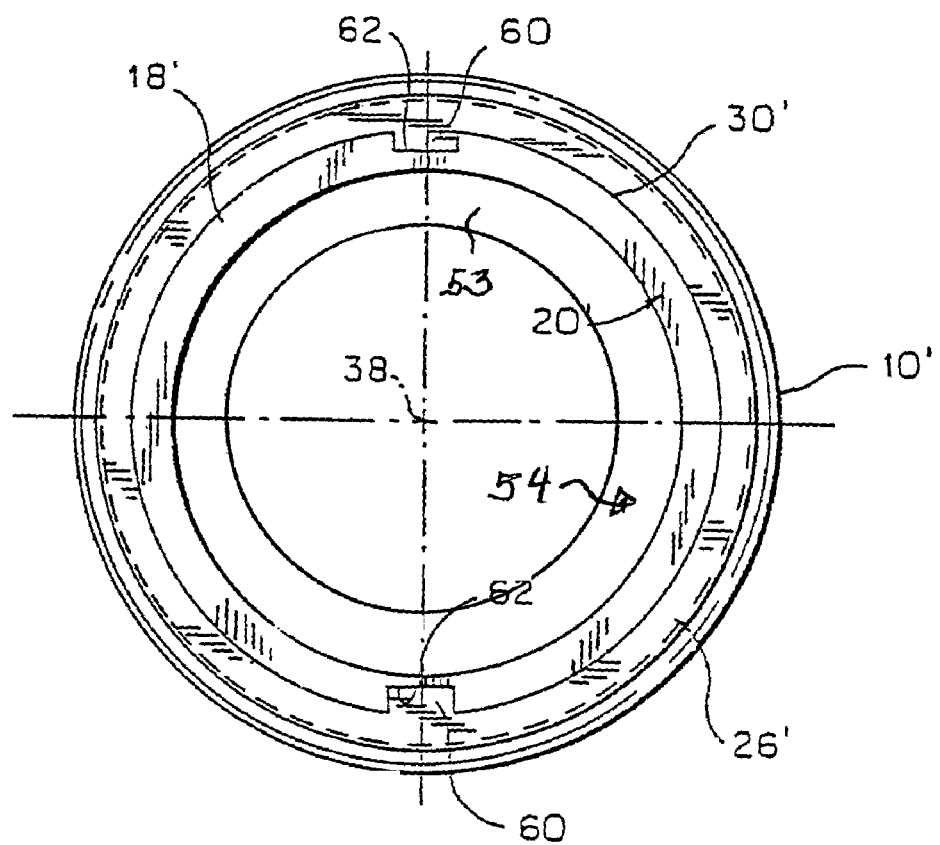
FIG. 6 is a top view showing a second embodiment of a can and adaptor configured in accordance with the present invention.

Referring now to FIG. 6 there is shown another embodiment of the invention wherein a non-circular opening 30' in a land 26' of a can 10' has at least one inwardly projecting tab 60. The inwardly projecting tab 60 registers with a groove 62 in an externally threaded rim 18' of an adaptor 20' in order to prevent the adaptor 20' from rotating with respect to the can 10' as a bowl 12 (see FIGS. 1 and 2) is threaded onto a rim 18' of the adaptor. Preferably, as shown in FIG. 6, there are two tabs 60 positioned opposite one another on the land 26' and two grooves 62 positioned opposite one another in the rim 18' of the adaptor 20' for receiving the two tabs in order to prevent rotation of the adaptor 20' with respect to the can 10'.

While two preferred embodiments of the invention have been illustrated, applicant emphasizes that there are other configurations within the scope of the invention, wherein the land 26 has a non-circular opening which is complemented by a non-circular shape of the rim 18. Preferably, the non-circularity is created by projecting a segment or portion of the edge 32 defining the non-circular opening 30 toward the axis 38 so that there is always enough space for the gasket 22 of the bowl 12 to engage the top surface 24 of the land 26.

From the foregoing description, one skilled in the art can easily ascertain the essential characteristics of this invention, and without departing form the spirit and scope thereof, can make various changes and modifications of the invention to adapt it to various usages and conditions.

We claim:

1. A can for containing a filter element, the can having a water collecting bowl attached thereto, the can comprising:

an annular housing for containing a filter element, the annular housing having a first end and a second end, the first end being defined by an inwardly projecting land having an opening therethrough defined by a non-circular edge, and an annular adaptor having a shoulder for positioning inside of the can adjacent to the annular land, the annular adaptor having an externally threaded annular rim disposed about an axis for threadably attaching the bowl thereto, the annular rim being non-circular and complementing the non-circular edge of the annular land to prevent rotation of the adaptor with respect to the can as the bowl is threaded thereon.

2. The can of claim 1 wherein the non-circular edge comprises at least one non-circular portion facing inwardly toward the axis of the rim, the non-circular portion being spaced from the axis by a distance which is less than that of other portions defining the opening.

3. The can of claim 1 wherein the non-circular edge is a chord of a circle otherwise defining the opening and wherein the rim has a flat complementing the chord.

4. The can of claim 1 wherein the non-circular opening defined by the edge includes two chords of a circle otherwise defining the opening.

5. The can of claim 1 wherein the non-circular edge of the land comprises at least one tab projecting inwardly from the perimeter of the opening, and wherein the annular rim has a slot therein for receiving the tab for preventing rotation of the annular adaptor with respect to the can.

6. The can of claim 1 wherein the non-circular edge has two tabs projecting radially inward therefrom, and the annular rim has two axially extending slots for receiving the tabs to prevent rotation of the annular adaptor with respect to the housing after assembly therewith.

7. The can of claim 1 wherein the can is made of metal and the annular adaptor is made of plastic.

8. The can of claim 7 wherein the annular adaptor is made of polyamide or polypropylene.

9. A filter assembly comprising:

an annular filter element;

a water collecting bowl with an internal thread thereon;

an annular housing for containing the annular filter element, the annular housing having a first end and a second end, the first end being defined by an inwardly projecting land having an opening therethrough defined by a non-circular edge, and an annular adaptor having a shoulder for positioning inside of the annular housing adjacent to the annular land, the annular adaptor having an externally threaded annular rim disposed about an axis for threadably attaching the bowl thereto; the annular rim being non-circular and complementing the non-circular edge of the annular land to prevent rotation of the adaptor with respect to the annular housing as the bowl is threaded thereon, and the annular adaptor being held in cooperation with the non-circular edge by the annular filter element.

10. The filter assembly of claim 9 wherein the non-circular edge comprises at least one non-circular portion facing inwardly toward the axis of the rim, the non-circular portion being spaced from the axis of the rim by a distance that is less than that of other portions defining the opening.

11. The filter assembly of claim 9 wherein the non-circular edge is a chord of a circle otherwise defining the opening and wherein the rim has a flat complementing the chord.

12. The filter assembly of claim 9 wherein the noncircular opening defined by the edge includes two chords of a circle otherwise defining the opening.

13. The filter assembly of claim 9 wherein the noncircular edge of the land comprises at least one tab projecting inwardly from the perimeter of the opening, and wherein the annular rim has a slot therein for receiving the tab for preventing rotation of the annular adaptor with respect to the housing.

14. The filter assembly of claim 9 wherein the non-circular edge has two tabs projecting radially inward therefrom, and the annular rim has two axially extending slots for receiving the tabs to prevent rotation of the annular adaptor with respect to the housing after assembly therewith.

15. The filter assembly of claim 9 wherein the can is made of metal and the annular adaptor is made of plastic.

16. The filter assembly of claim 15 wherein the annular adaptor is made of polyamide or polypropylene.

17. The filter assembly of claim 1 wherein the annular filter element directly abuts the shoulder of the annular adaptor.

\* \* \* \* \*